(12) United States Patent
Patstone et al.

(10) Patent No.: US 8,454,877 B2
(45) Date of Patent: Jun. 4, 2013

(54) METHOD AND APPARATUS FOR MOLDING AN ARTICLE

(75) Inventors: Christopher H. Patstone, Northampton, MA (US); Joseph C. Strzegowski, Conway, MA (US)

(73) Assignee: Pelican Products, Inc., South Deerfield, MA (US)

( * ) Notice: Subject to any disclaimer, the term of this patent is extended or adjusted under 35 U.S.C. 154(b) by 350 days.

(21) Appl. No.: 12/752,565

(22) Filed: Apr. 1, 2010

(65) Prior Publication Data

US 2010/0252958 A1    Oct. 7, 2010

Related U.S. Application Data

(60) Provisional application No. 61/166,450, filed on Apr. 3, 2009, provisional application No. 61/166,452, filed on Apr. 3, 2009, provisional application No. 61/169,340, filed on Apr. 15, 2009.

(51) Int. Cl.
*B29B 7/20* (2006.01)

(52) U.S. Cl.
USPC ............ 264/310; 264/318; 264/319; 264/503

(58) Field of Classification Search
USPC ............ 264/318, 336, 2.1, 8, 45.7, 503, 310, 264/312, 319; 425/441, DIG. 58, 435
See application file for complete search history.

(56) References Cited

U.S. PATENT DOCUMENTS 2,896,352 A * 7/1959 Strauss ......................... 264/311
2003/0164576 A1 * 9/2003 De Winter et al. ............ 264/318

* cited by examiner

*Primary Examiner* — Timothy Kennedy
(74) *Attorney, Agent, or Firm* — McCormick, Paulding & Huber LLP

(57) ABSTRACT

An apparatus for molding an article. The apparatus includes a mold and a mold plate slidable between a first position and a second position within the mold. In the first position the mold plate creates an undercut feature in a molded article in the second position the molded article with the undercut feature may be easily removed from the mold without damaging the mold or the article.

5 Claims, 5 Drawing Sheets

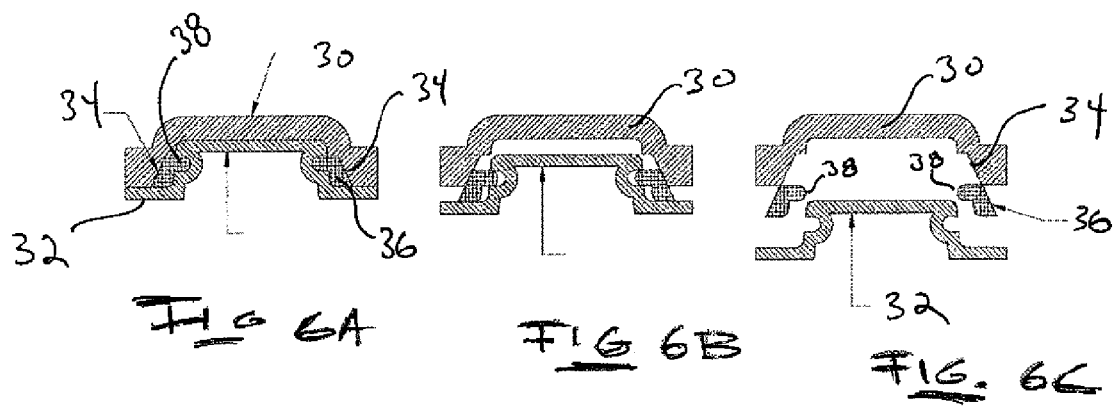

METHOD AND APPARATUS FOR MOLDING AN ARTICLE

CROSS REFERENCE TO RELATED APPLICATIONS

This application claims the benefit of U.S. Provisional Application No. 61/166,450, filed Apr. 3, 2009, entitled "Container Attachment Device"; and further claims the benefit of U.S. Provisional Application No. 61/166,452, filed Apr. 3, 2009, entitled "Method And Apparatus For Molding An Article"; and further claims the benefit of U.S. Provisional Application No. 61/169,340, filed Apr. 15, 2009, entitled "Container Attachment Device"; all of which are hereby incorporated by reference in their entireties.

FIELD OF THE INVENTION

This invention relates, in general, to a method and apparatus for molding an article, and deals more particularly with a method and apparatus in which a series of slots are molded into a container assembly facilitating the attachment of accessories to the assembly.

BACKGROUND OF THE INVENTION

Containers of various shapes, sizes and configurations have been employed to accommodate all manner of storage and transportation. Typically, in the case of containers primarily utilized to transport items, it is often necessary to protect these items from impact and/or environmental damage, as well as to make the container suitable for stacking and storage during transportation. These cases are generally manufactured through a rotational molding process, which offers impact resistant protection, strength, and watertight packaging.

To facilitate stacking, containers may include outer surfaces having structural profiles or stacking patterns. Such patterns allow other like containers to be stacked with one another during transport. The stacking patterns utilize complementary patterns on opposing sides of the container, oftentimes being mirror images of each other. For example, a stacking pattern may include a lid featuring a series of parallel ribs. The base may, in turn, have a series of protrusions that fit between the ribs allowing the base of a first container to be securely stacked on a lid of a second container.

In many applications, it is also desirable to be able to removably secure an accessory to a container. As will be appreciated, the type of accessory to be attached will vary depending upon the application. Regardless of the type of accessory, it is desirable that the accessory can be conveniently and securely attached in a variety of potential locations. It is also desirable that, once an accessory is removed, the container may be stacked upon another like container without the removal of the attachment mechanism.

To accomplish this, it has been found that with containers that include ribs in their stacking pattern, such as on the container lid, attachment devices that can receive and hold accessories may be secured between adjacent ribs, provided the ribs include a secure attachment location therefore. It has been further determined that a preferred attachment location for the secure and varied placement of such an attachment device is a series of undercut slots formed in a side surface of a rib.

Molding a stacking pattern with a series of undercut slots is not without its challenges. As stated, such containers are preferably rotomolded by melting powdered plastic in a mold. Forming the undercut slots is potentially problematic in that the undercuts may prevent removal of the container from the molding tool.

With the forgoing problems and concerns in mind, it is the general object of the present invention to provide a convenient method of molding containers to form a series of undercut slots allowing attachment of devices for holding accessories to a container.

SUMMARY OF THE INVENTION

It is an object of the present invention to provide a method and apparatus for molding an article.

It is another object of the present invention to provide a method and apparatus for molding a container assembly.

It is another object of the present invention to provide a method and apparatus for molding a container assembly that includes attachment points that facilitate the attachment of a device for holding an accessory to a container assembly.

It is another object of the present invention to provide a method and apparatus for molding a container assembly that includes a series of undercut slots that facilitate the attachment of a device for holding an accessory to a container assembly.

It is yet another object of the present invention to provide a method and apparatus for molding a container assembly in which a slidable mold plate is employed to form a series of undercut slots that facilitate the attachment of a device for holding an accessory to a container assembly.

It is yet another object of the present invention to provide a method and apparatus for rotationally molding a stackable container assembly in which a slidable mold plate is employed to form a series of undercut slots in a stacking pattern of the container assembly to facilitate the attachment of a device for holding an accessory to the assembly.

An embodiment of the present invention is an apparatus for molding an article. The apparatus includes a mold and a mold plate slidable between a first position and a second position within the mold. In the first position the mold plate creates an undercut feature in a molded article in the second position the molded article with the undercut feature may be easily removed from the mold without damaging the mold or the article.

These and other objectives of the present invention, and their preferred embodiments, shall become clear by consideration of the specification, claims and drawings taken as a whole.

BRIEF DESCRIPTION OF THE DRAWINGS

FIGS. 6A-6C depict an alternative embodiment of the inventive apparatus for molding an article.

DETAILED DESCRIPTION OF THE PREFERRED EMBODIMENT

Figures 1, 1A:
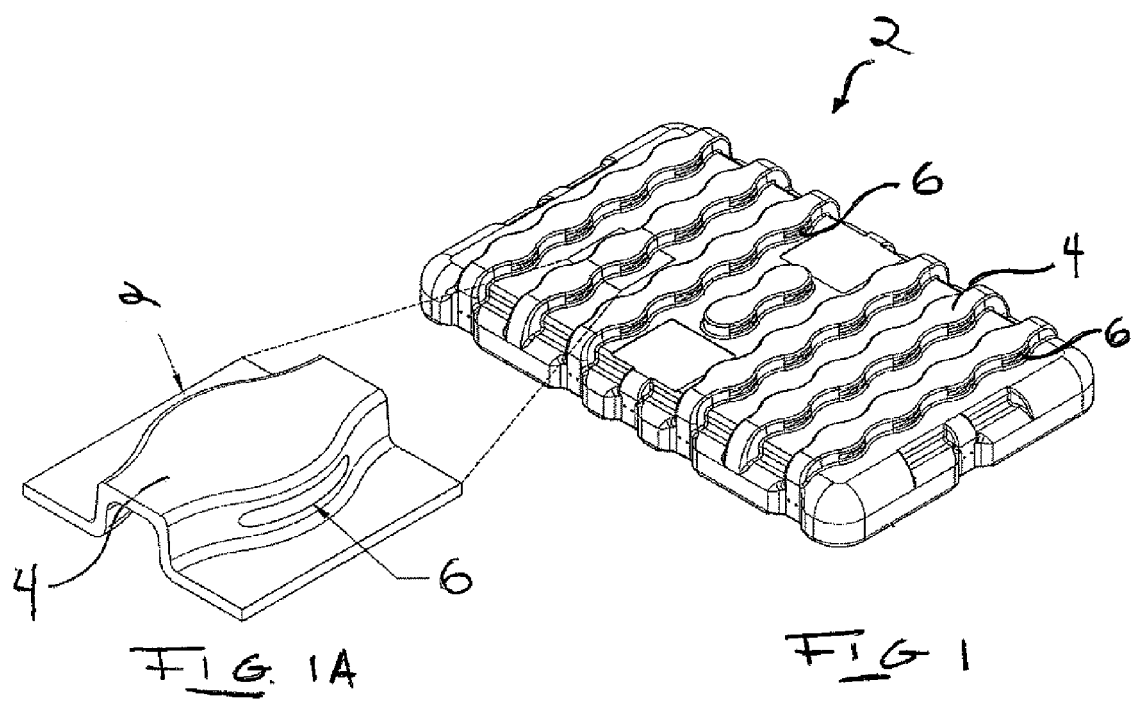
FIG. 1 is a perspective view of a container lid having a stacking pattern with an undercut slot in accordance with an embodiment of the present invention.
FIG. 1A is an enlarged view of the stacking pattern and undercut slot of FIG. 1.

FIGS. 1 and 1A generally illustrate a lid 2 of a container assembly that may be manufactured using the inventive method and apparatus for molding an article. As shown, the lid 2 has a stacking pattern that includes a series of ribs 4.

As will be appreciated, the base (not shown) has a complementary stacking pattern that facilitates stacking of multiple container assemblies.

The ribs 4 include opposing side surfaces or walls, which feature an undercut slot 6. More specifically, the ribs 4 have a sinusoidal or wave-like configuration, and the side walls 11 include an alternating and repeating series of convex and concave portions. The slots 6 are formed in the convex portions of the side walls. The slots 6 receive a portion of an attachment device and allow such a device to be securely fastened between the ribs 4. The slots 6 may have a variety of shapes and dimensions as long as they are sized to facilitate the secure and stable attachment of the inventive device.

The slots 6 allow for the secure attachment of an accessory to the lid 2. Moreover, the repeating pattern of slots 6 allows for a high degree of flexibility in the location of an accessory on the lid 2. The undercut nature of the slots 6 also does not interfere with the normal stacking function of the ribs 4 and the complementary pattern of the base (not shown) when an accessory has been removed.

The above-described lid and container assembly are preferably rotationally molded, i.e., "rotomolded" from powdered plastic. As is conventionally done, the powdered plastic is first placed in a mold and then heated and rotated about two axes. As a result, the plastic melts and forms to the inside shape of the mold. The mold is then cooled, opened and the plastic part is removed.

Figure 2:
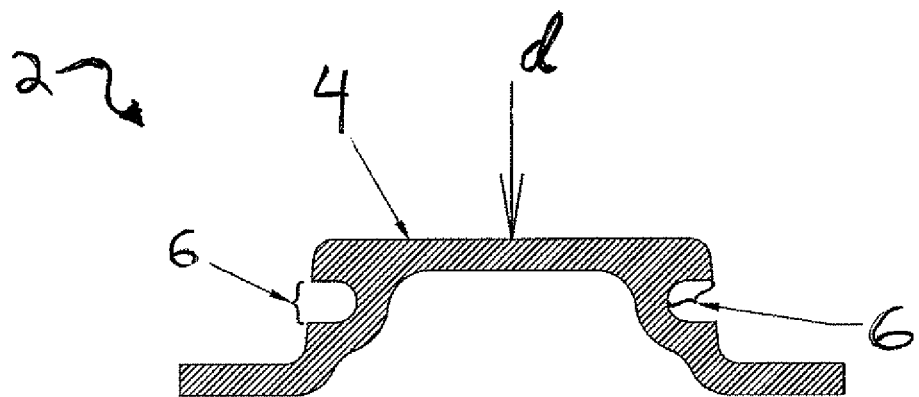
FIG. 2 is a sectioned view of a rib of the stacking pattern of FIG. 1.

Molds may include two or more parts, depending on the type of article or part to be molded and sometimes draft is desirable to facilitate removal of the molded article. Regardless of the structure of the mold, it is generally understood that undercuts of any significant size in the molded article may render the article impossible to remove without damaging the article and/or the mold. Referring to FIG. 2, the lid 2 is removed from a mold in direction d. As will be appreciated, if a fixed portion of the mold extends into the slots 6 removal of the lid 2 will not be possible.

Figure 3:
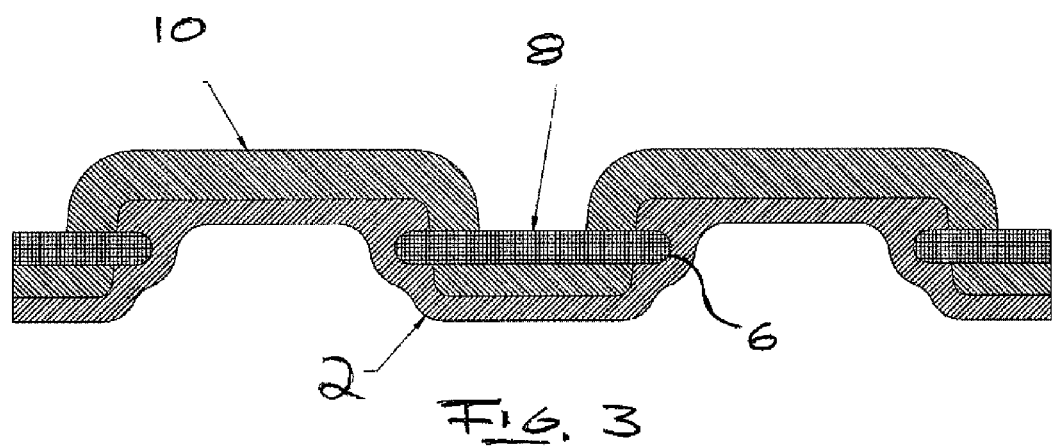
FIG. 3 is a sectioned view of an apparatus for molding an article according to an embodiment of the present invention depicting a mold, slidable mold plate and container assembly having the stacking pattern and undercut slot of FIG. 1.

Referring now to FIG. 3, the present invention utilizes sliding mold plate 8 to avoid any of the problems mentioned above. As shown, the lid 2 is being cast within a mold 10. Undercut slots 6 are formed on the sides of each rib through the extension of the plate 8 outward and into a channel in the mold, which forms each rib.

The slidable mold plate 8 is an important aspect of the present invention. As will be appreciated, the plate 8 allows for the creation of a series of undercut features at once, saving operators time and money. The plate 8 also creates an undercut surface that is perpendicular to the direction of pull of the plate, i.e., the plate does not need to be withdrawn in the direction of the undercut. Such an arrangement can facilitate keeping the overall mold size small, thus easing servicing, operating, and maintenance issues. Moreover, the plate 8 may be permanently attached to the mold and does not require the use of large throw clamps to move it out of position. As such, the inventive plate is less susceptible to damage, wear, or loss, and provides an ease of manufacture heretofore unknown in the art.

Additionally, an important aspect of the slidable mold plate is that during the molding of the part, it is essentially toggled back and forth between two different profiles in order to create a feature in the part, and then allow for easy, quick, and low-maintenance demolding of that feature. It can be easily seen that such a plate can be selectively used to create or not create features in the molded part as needed—the decision to toggle the plates in one area of the mold but not the other will allow a feature to be created in certain locations while not in others. Additionally it can be seen that in cases where the release of molding undercuts is not an issue, the plate can have two different profiles such that two different features can be easily and at will, molded into the part when and as needed.

Figures 4, 5:
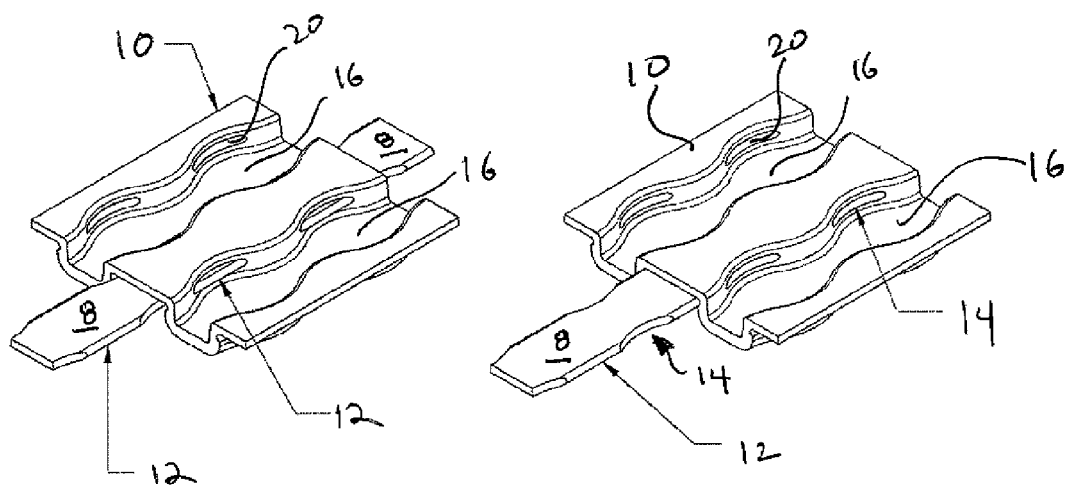
FIG. 4 is a perspective view of the inside surface of the mold of FIG. 3 depicting the slidable mold plate in an aligned mold position.
FIG. 5 is a perspective view of the inside surface of the mold of FIG. 3 depicting the slidable mold plate in a de-mold position.

The structure and operation of the mold plate is more clearly shown in FIGS. 4 and 5 which depict a mold 10 having channels 16 into which the plastic is placed and melted to form a portion of a container assembly such as a lid. As depicted, the slidable plate 8 has a series of alternating edge portions, which include a mold edge 12 and a scalloped or recessed edge 14. These portions alternate along the length of the plate 8. The recessed edge 14 is shaped to match the shape of a rib that is to be molded (not shown) so as to not interfere with removal of rib and lid (or base). The plate 8 extends from one side of the mold to the opposite side creating a maximum number of repeating features with minimal operator work.

In use, the plate 8 is put into a mold position (FIG. 4) in which the mold edge 12 extends through a slot 20 in the mold 10 and into the mold channel 16. Plastic is then added and the lid is rotationally molded. The mold edge 12 forms the series of undercut features in the lid. Once the molding process is complete, the slidable plate 8 is slid into a de-mold position (FIG. 5) in which the recessed edge 14 is now aligned with the slot 20. As will be appreciated, the molded lid with its series of undercut features may then be easily removed from the mold 10. Preferably, the length of the mold edge 12 is shorter than that of the recessed edge 14 so that there is sufficient room between the plate and the mold to allow for differing rates of thermal expansion, manufacturing tolerance and sliding tolerance to ensure the quality of the molded part.

Moreover, as stated, the recessed edge 14 generally conforms to the shape of the rib that is to be molded. As such, if the mold is used with a plate 8 in the "de-mold" position, or partially in such a position, a rib would simply be formed without the undercut feature. This rib could then be removed from the mold without issue. It is therefore important that the non-undercut forming areas, i.e., the recessed edge 14, be shaped so as to not create any undercuts or pockets that interfere with mold removal. That said, it is be desirable that the mold cannot be closed unless the plates 8 are in their proper positions.

Referring again to FIGS. 4 and 5, the pattern of edge surfaces 12, 14 allows the part to be removed from the mold by sliding the plate one-half the distance between undercut features to be removed. That is, in a preferred embodiment, the ribs in which the undercuts are to be formed are spaced 4 inches from center to center, and the peaks in the wave-like ribs are also 4 inches apart. Given this distance, the plate 8 is configured to have a range of motion of 2 inches so that when a lid is to be de-molded, the plate 8 is slid only 2 inches from the mold position. This allows for the use of small, easy to operate clamping mechanisms and, importantly, the slider is never removed from the mold, eliminating potential damage and greatly reducing friction-induced wear or misplacement and loss of loose parts.

The plate 8 may be slid into and out of the de-mold position through a variety of means. These include manual, power assisted and even automated mechanisms. In particular, a separate mechanism, which clamps on to the mold before or after the molding process may be employed. Alternatively, the mechanism could be part of a stationary system that the mold clamps to or interacts with, that is present throughout the molding process.

As shown in FIGS. 6A-6C, an alternate embodiment can create the undercut slots through a mold with a main fixed body 30, and several smaller, wedge shaped movable sections 36. The moving sections 36 would include the undercut features 38. When the plastic article 32 is removed, the movable sections 36 would at first move with the part away from the main mold section 30, but due to the angled interface 34 of the main body 30 and the movable sections 36, they would also be pulled away from the plastic part 32. The sliding sections 36 would be permanently attached to the main mold section 30, and once the article 32 is removed from the mold, the movable mold sections 36 would be drawn back into place by springs, magnets, etc. (not shown). Alternately, the movable sections 36 could be removed from the mold with the article 32, separated from the article 32, and then placed back in the mold for the next mold cycle.

Moreover, alternate methods of adding undercut slots could involve use of high temperature-compatible silicone rubbers or other suitable flexible, heat-conductive materials. The mold cavity sections which form the undercut sections in the plastic article could be constructed using these flexible materials, so that removal of the plastic part would involve the rubber sections flexing out of the way.

Finally, it may also be possible to employ hinged metal mold sections. In this configuration, the moving members could be held in place by springs, magnets, and the like during the molding cycle. During removal of the plastic article, any section over the undercut sections would pivot out of the way.

While the invention has been described in relation to a lid with ribs, it should be apparent that the invention may be employed to mold ribs and cuts on the bottom, sides or other locations of an article where appropriate. Moreover, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A method of molding an article, said method comprising the steps of:
   providing a mold, said mold including a mold channel having an opening therein;
   sliding a mold plate in a direction parallel to said mold channel and into a first position within said mold, wherein in said first position said mold plate extends through said opening and into said channel to create an undercut feature in said article;
   placing a material within said mold to create said article;
   molding said article from said material, wherein said molding of said article includes heating said material in said mold and rotating said mold;
   sliding said mold plate in a direction parallel to said mold channel and into a second position within said mold, wherein in said second position said mold plate does not extend into said channel through said opening; and
   removing said molded article from said mold, said article containing an undercut feature.

2. The method of claim 1 wherein said mold plate has an edge portion, said edge portion having a mold edge and a recessed edge; and
   wherein in said first position said mold edge extends through said opening into the mold channel to create said undercut feature and in said second position said recessed edge is in alignment with, and does not extend through, said opening such that a molded article having an undercut feature may be removed from said mold channel.

3. The method of claim 1 wherein said mold has a plurality of adjacent mold channels to create a plurality of molded features in an article.

4. The method of claim 1 wherein said mold channel has a plurality of openings in said channel to create a series of undercut features in a molded article.

5. A method of molding an article, said method comprising the steps of:
   providing a mold, said mold including a mold channel defined by opposed first and second sidewalls, at least one of said sidewalls having an opening therein;
   selecting between a first position in which a mold plate extends through said opening in one of said sidewalls into said channel and towards the other of said sidewalls to create an undercut feature in said article and a second position in which said mold plate does not extend through said opening and into said channel so that an undercut feature is not created in said article;
   placing a material within said mold to create said article;
   molding said article from said material, said step of molding said article including heating said material in said mold and rotating said mold; and
   removing said molded article from said mold.

\* \* \* \* \*